United States Patent
Weiss

(10) Patent No.: US 8,648,822 B2
(45) Date of Patent: *Feb. 11, 2014

(54) RECOGNIZING SELECTION REGIONS FROM MULTIPLE SIMULTANEOUS INPUTS

(75) Inventor: John Guido Atkins Weiss, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 255 days.

This patent is subject to a terminal disclaimer.

(21) Appl. No.: 13/069,194

(22) Filed: Mar. 22, 2011

(65) Prior Publication Data

US 2011/0169762 A1    Jul. 14, 2011

Related U.S. Application Data

(63) Continuation of application No. 11/755,660, filed on May 30, 2007, now Pat. No. 7,936,341.

(51) Int. Cl.
*G06F 3/041* (2006.01)

(52) U.S. Cl.
USPC ............................................. 345/173; 345/178

(58) Field of Classification Search
USPC ................... 345/166–179; 323/304; 463/20; 715/863; 348/207.99
See application file for complete search history.

(56) References Cited

U.S. PATENT DOCUMENTS

| | | | |
|---|---|---|---|
| 6,888,536 B2 | 5/2005 | Westerman | |
| 7,158,122 B2 | 1/2007 | Roberts | |
| 7,835,999 B2 | 11/2010 | Block | |
| 7,877,707 B2 * | 1/2011 | Westerman et al. | 715/863 |
| 7,924,271 B2 * | 4/2011 | Christie et al. | 345/173 |
| 8,368,653 B2 * | 2/2013 | Han et al. | 345/173 |
| 2006/0097991 A1 | 5/2006 | Hotelling | |
| 2007/0236478 A1 | 10/2007 | Geaghan | |
| 2007/0285404 A1 * | 12/2007 | Rimon et al. | 345/173 |
| 2008/0157867 A1 | 7/2008 | Krah | |
| 2008/0158176 A1 | 7/2008 | Land | |
| 2008/0165140 A1 * | 7/2008 | Christie et al. | 345/173 |
| 2008/0165141 A1 * | 7/2008 | Christie | 345/173 |
| 2008/0165255 A1 * | 7/2008 | Christie et al. | 348/207.99 |
| 2008/0168403 A1 * | 7/2008 | Westerman et al. | 715/863 |
| 2008/0170046 A1 * | 7/2008 | Rimon et al. | 345/174 |
| 2008/0180404 A1 | 7/2008 | Han | |
| 2008/0222540 A1 * | 9/2008 | Schulz et al. | 715/764 |
| 2008/0309634 A1 * | 12/2008 | Hotelling et al. | 345/173 |

(Continued)

OTHER PUBLICATIONS

U.S. Appl. No. 11/755,660, filed Jan. 24, 2011, Notice of Allowance.

(Continued)

*Primary Examiner* — Prabodh M Dharia
(74) *Attorney, Agent, or Firm* — Glenn Johnson; Andrew Sanders; Micky Minhas

(57) ABSTRACT

The present invention extends to methods, systems, and computer program products for recognizing selection regions from multiple simultaneous inputs. Input selection regions are calculated from simultaneous contacts on a multi-touch input display surface. Computer system users can use natural and/or more intuitive hand gestures to select items on an input/display surface. Selection regions can be dynamically adjusted to in response to detected changes in contact at different locations on a surface. For example, selection region changes can be updated in essentially real-time as fingers are added and moved on the multi-touch input display surface. The calculation of selection regions can vary based on an application and/or operating system context.

18 Claims, 15 Drawing Sheets

(56) References Cited

U.S. PATENT DOCUMENTS

| | | |
|---|---|---|
| 2010/0130280 A1 | 5/2010 | Arezina |
| 2010/0182136 A1* | 7/2010 | Pryor ................... 340/425.5 |
| 2010/0192109 A1* | 7/2010 | Westerman et al. ........ 715/863 |
| 2010/0211920 A1* | 8/2010 | Westerman et al. ........ 715/863 |
| 2011/0239155 A1* | 9/2011 | Christie ................... 715/784 |
| 2012/0139860 A1* | 6/2012 | Hotelling et al. ............ 345/173 |

OTHER PUBLICATIONS

U.S. Appl. No. 11/755,660, filed Jan. 21, 2011, Notice of Allowance.
U.S. Appl. No. 11/755,660, filed Sep. 17, 2010, Office Action.

* cited by examiner

RECOGNIZING SELECTION REGIONS FROM MULTIPLE SIMULTANEOUS INPUTS

CROSS-REFERENCE TO RELATED APPLICATIONS

This application is a continuation of U.S. patent application Ser. No. 11/755,660 filed on May 30, 2007 and entitled "RECOGNIZING SELECTION REGIONS FROM MULTIPLE SIMULTANEOUS INPUTS," which application is hereby expressly incorporated herein by this reference in its entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

A common computing task in many computing environments includes selecting a set of objects. Thus, many computer system applications provide user interface mechanisms for graphically selecting a set of objects. Selected objects can vary, but include for example file icons on a graphical desktop, pixels in a photograph editing application, and vertices in a three dimensional graphics program.

A set of objects it typically selected so that an operation can be performed on the set of objects. For example, a group of files can be selected from a file manager and then a common file operation, such as, for example, copying moving, deleting, etc, can be performed on the group of files. Selecting a group of items advantageously allows an operation to be performed on multiple items at once as opposed to selecting and performing the operation on each item individually.

Most graphical selection mechanisms include using a mouse (or other pointing device) as the primary input device. One common type of selection is "click and drag" selection. For example, a user can move the cursor to a specified location on the screen and "click" a left mouse button to indicating a starting anchor location for a selection region. The cursor is then moved up/down and left/right and the computer system creates a rectangular selection region based on the cursor's distance and direction from the anchor point. Any items that intersect or that are within the rectangular region are included in the selected group of items.

Some other "click and drag" selection mechanisms also permit the creation of elliptical selection regions. These mechanisms are similar to rectangular selection except that the rectangle defines the bounds of the elliptical selection region. Still other "click and drag" selection mechanisms permit drawing an outline of a polygonal selection area. Further, other mechanisms can be used in combination with keyboard commands to define multiple discrete points of a polygonal selection area.

However, all of these selection mechanisms use a single point (e.g., the mouse position) moved over time to create the selection region. Thus, all of these mechanisms have at least a number of drawbacks. First, input is essentially indirect in that a polygon or other geometric shape is created from altering a single point on the screen. Additionally, since a single point is used these mechanisms lack flexibility. For example, modifying earlier steps in the selection process typically requires an additional operation. That is, there is no easy way to unselect a boundary or portion of a selection region. Further, complex selections can involve multiple consecutive steps and can rely on the use of keyboard commands in combination with mouse movements. Use of keyboard commands increases flexibility somewhat, but also increases complexity.

BRIEF SUMMARY

The present invention extends to methods, systems, and computer program products for recognizing selection regions from multiple simultaneous inputs. In some embodiments, an input region calculation module receives contact input data indicating simultaneous contact at one or more areas of the multi-touch input display surface. Contact input data can indicate boundaries of an area of contact on the multi-touch input display surface. Alternately (or in combination), contact input data can include a set of (ordered or unordered) points. The set of points indicates at least that simultaneous contact with the multi-touch input display surface was detected at a first location and a second location on the multi-touch input display surface.

The input region calculation module calculates a selection region on the multi-touch input surface based on the one or more areas of simultaneous contact. The input region calculation module identifies selected items displayed on the multi-touch input surface that are selected by the calculated selection region. The input region calculation module provides region visual feedback data to the multi-touch input surface to display the calculated selection region on the multi-touch input surface. The input region calculation module also provides item visual feedback data to the multi-touch input surface to visually indicate the selected items.

In further embodiments, the input region calculation module receives second subsequent contact input data indicating contact on one or more different areas of the multi-touch input display surface subsequent to receiving first contact input data. The input region calculation module calculates a second selection region on the multi-touch input display surface based on second contact input data. The input region calculation module interpolates an area on the multi-touch input display surface between the first selection region and the second selection region.

The input region calculation module interpolates an area connecting and between the first selection region and the second selection region. The input region calculation module determines that the region for selecting items displayed on the multi-touch input display surface includes the first selection region, the interpolated area, and the second selection region. The input region calculation module updates identified selected items displayed on the multi-touch input display surface. The input region calculation module updates region visual feedback and item visual feedback. Accordingly, these further embodiments allow a user to "paint" a selection region.

This summary is provided to introduce several concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
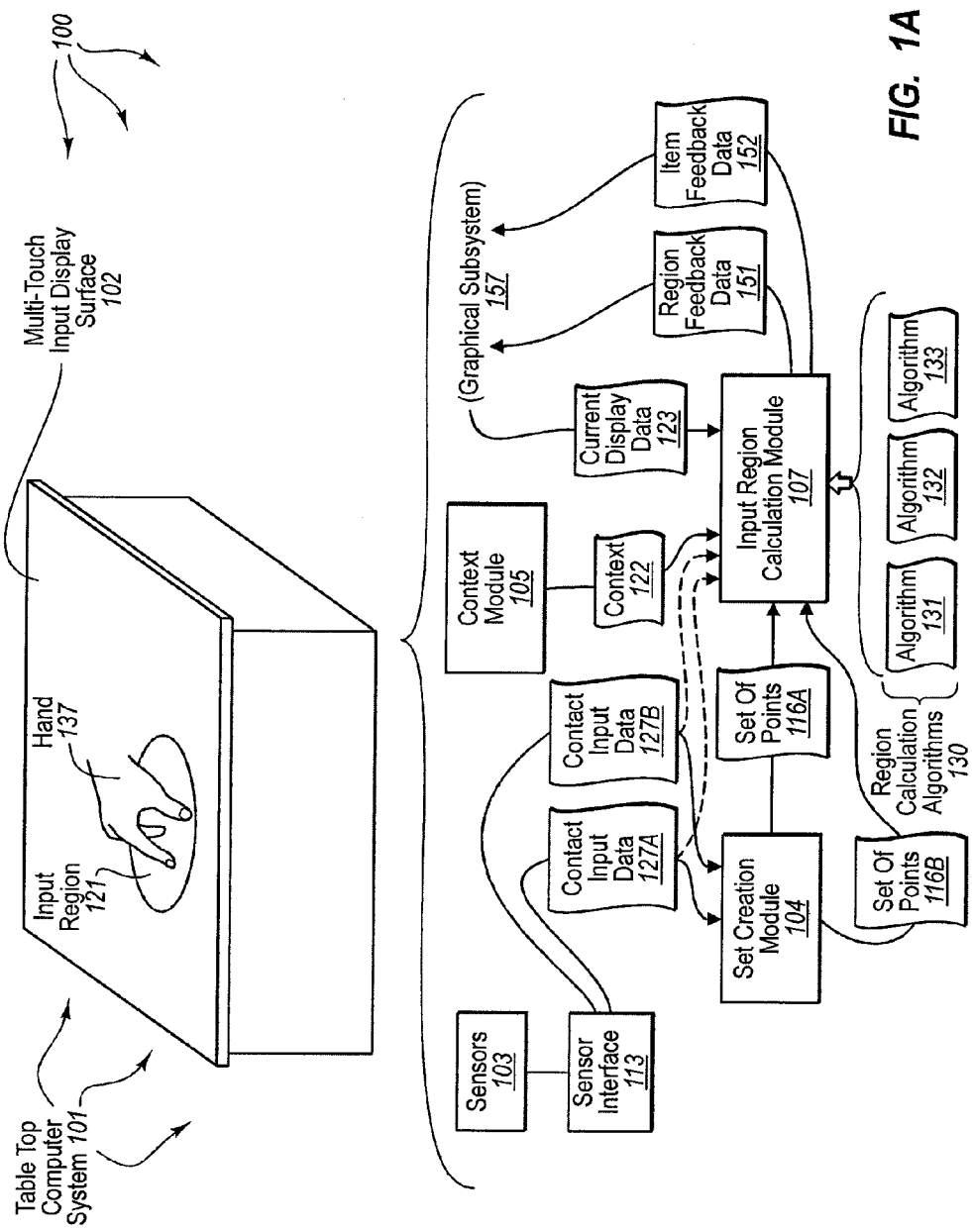
FIG. 1A illustrates an example computer architecture that facilitates recognizing selection regions from multiple simultaneous inputs.

The present invention extends to methods, systems, and computer program products for recognizing selection regions from multiple simultaneous inputs. In some embodiments, an input region calculation module receives contact input data indicating simultaneous contact at one or more areas of the multi-touch input display surface. Contact input data can indicate boundaries of an area of contact on the multi-touch input display surface. Alternately (or in combination), contact input data can include a set of (ordered or unordered) points. The set of points indicates at least that simultaneous contact with the multi-touch input display surface was detected at a first location and a second location on the multi-touch input display surface.

The input region calculation module calculates a selection region on the multi-touch input surface based on the one or more areas of simultaneous contact. The input region calculation module identifies selected items displayed on the multi-touch input surface that are selected by the calculated selection region. The input region calculation module provides region visual feedback data to the multi-touch input surface to display the calculated selection region on the multi-touch input surface. The input region calculation module also provides item visual feedback data to the multi-touch input surface to visually indicate the selected items.

In further embodiments, the input region calculation module receives second subsequent contact input data indicating contact on one or more different areas of the multi-touch input display surface subsequent to receiving first contact input data. The input region calculation module calculates a second selection region on the multi-touch input display surface based on second contact input data. The input region calculation module interpolates an area on the multi-touch input display surface between the first selection region and the second selection region.

The input region calculation module interpolates an area connecting and between the first selection region and the second selection region. The input region calculation module determines that the region for selecting items displayed on the multi-touch input display surface includes the first selection region, the interpolated area, and the second selection region. The input region calculation module updates identified selected items displayed on the multi-touch input display surface. The input region calculation module updates region visual feedback and item visual feedback. Accordingly, these further embodiments allow a user to "paint" a selection region.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

However, it should be understood, that upon reaching various computer system components program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates recognizing selection regions from multiple simultaneous inputs. Depicted in computer architecture 100 is table top computer system 101. Table top computer system 101 includes sensors 103, sensors interface 113, set creation module 104, context module 105, input region calculation module 107, and graphical subsystem 157.

Table top computer system 101 can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, the components of table top computer system 101 are configured to recognize selection regions from multiple simultaneous inputs.

Sensors 103 can be configured to detect when a physical object (e.g., a bottle, a glass, a finger, a hat, etc.) has come into physical contact with a portion of the multi-touch input display surface 102. For example, sensors 103 can detect when a portion of hand 137 has come in contact with multi-touch input display surface 102. Sensors 103 can be embedded in multi-touch input display surface 102 and can include for example, pressure sensors, temperature sensors, image scanners, barcode scanners, etc., that interoperate with sensor interface 113 to detect multiple simultaneous inputs.

In some embodiments, multi-touch input display surface 102 includes sensors for implementing a touch screen interface. For example, multi-touch input display surface 102 can include an interactive multi-touch surface. Thus, it may be that multi-touch input display surface 102 also functions as a presentation surface to display video output data to a user of table top computer system 101.

Sensors 103 can be included (e.g., embedded) in a plurality of locations across multi-touch input display surface 102. Sensors 103 can detect locations where physical contact with the multi-touch input display surface 102 has occurred. The density of sensors 103 can be sufficient such that contact across the entirety of touch input display surface 102 can be detected. Thus, sensors 103 are configured to detect and differentiate between simultaneous contact at a plurality of different locations on the multi-touch input surface 102

Sensors 103 can sample the entire surface of multi-touch input display surface 102 at specified intervals, such as, for example, 1 ms, 5 ms, etc. for detected contact. At each sampling interval, raw sensor data indicating the sampling results, including locations and/or area of any detected contact with multi-touch input surface 102, is sent to sensor interface 113. Thus, sensor output from sensors 103 can be raw sensor signal data indicating simultaneous contact at a plurality of different locations and/or areas on multi-touch input display surface 102.

Sensor interface 113 can receive raw sensor signal data from sensors 103 and can convert the raw sensor signal data into contact input data (e.g., digital data) that can be compatibly processed by other modules of table top computer system 101. Sensor interface 113 or the other modules can buffer contact input data as needed to determine changes in a selection region over time.

For example, raw sensor signal data from sensors 103 can change (e.g., between sampling intervals) as new contacts are detected, existing contacts are moved, and existing contacts are released on multi-touch input surface 102. Thus, upon receiving an indication of contact on multi-touch input display surface 102, sensor interface 113 can initiate buffering of raw sensor signal data (e.g., within a buffer in system memory of table top computer system 101). As contacts on multi-touch input display surface 102 change, sensor interface 113 can track the changes in raw sensor signal data and update locations and ordering of detected contacts within the buffer.

For example, sensor interface 113 can determine that contact was first detected at a first location and then contact was subsequently simultaneously detected at the first location and a second location. Upon receiving an indication that contact is no longer detected anywhere on multi-touch input display surface 102, sensor interface 113 can convert the contents of the buffer to contact input data. Sensor interface 113 then sends the contact input data to other modules at table top computer system 101. Other modules can buffer the contact input data as needed to determine changes in a selection region over time.

For example, a buffer can be used to track points of contact as the points of contact remain and are moved about multi-touch input display surface 102. When contact is no longer detected on (e.g., when a hand is lifted off of) multi-touch input display surface 102, input region calculation module 107 can calculate the resulting selection region.

Context module 105 is configured to provide the current operating context of table top computer system 101 to input region calculation module 107. For example, context module 105 can indicate an application (e.g., photo editor) or operating system component (e.g., a file manager) that currently has focus. Based on the current operating context, sensor interface 113 can send contact input data to set creation module 104 and/or to input region calculation module 107.

Set creation module 104 is configured to abstract an area of contact to a coordinate location (e.g., Cartesian position) for a point. For example, when a finger (or thumb) contacts multi-touch input display surface 102, contact can be detected over an area approximately equal to the finger (or thumb) tip of the finger (or thumb). Set creation module 104 can utilize geometric calculations to calculate an appropriate coordinate location for an input point based on a detected area of contact. For example, if a (e.g., finger tip) contact area was the general shape of an oval, a coordinate location at or near the center of the oval can be calculated as the input point.

When multiple simultaneous areas of contact are received, set creation module 104 can abstract each area to a coordinate location. Each coordinate location can then be included in a set of points. Accordingly, set creation module 104 can create ordered and unordered sets of points from input contact data.

Input region calculation module 107 is configured to receive contact input data and/or a set of (ordered or unordered) points and recognize a selection region. Based on the current operating context, input region calculation module 107 can use different region calculation algorithms 130 to calculate a selection region. Thus, contact input data or a set of points can be used to recognize different selection regions based on the current operating context. For example, different applications can have different selection region requirements that are met by different region calculation algorithms.

Input region calculation module 107 can also receive current display data from graphical subsystem 157, for example, indicative of locations of items currently being displayed on multi-touch input display surface 102. From the calculated selection region and current display data, input region calculation module 107 can determine what items are selected by the calculated selection region. Selected items can include items that are within a calculated selection region. Alternately or in addition, selected items can include items that intersect with a calculated selection region (even if the item is not partially or fully within the calculated selection region).

Input region calculation module 107 can send region visual feedback data to graphical subsystem 157. The region visual feedback data indicates to graphical subsystem 157 where and how to display the calculated selection region on multi-touch input display surface 102. For example, region visual feedback data can indicate location (e.g., in Cartesian coordinates) and display characteristics (e.g., colors, shading, hatching, cross-hatching, etc.) for displaying the boundaries a calculated selection region on multi-touch input display surface 102. Region visual feedback data can also indicate display characteristics (e.g., colors, shading, hatching, cross-hatching, etc.) for displaying any enclosed interior area of a calculated selection region on multi-touch input display surface 102. Boundaries and any enclosed interior area can be displayed using the same or different display characteristics.

Input region calculation module 107 can also send item visual feedback data to graphical subsystem 157. The item visual feedback data indicates to graphical subsystem 157 how to visually indicate selected items on multi-touch input display surface 102. For example, item visual feedback data can indicate display characteristics (e.g., colors, shading, inverting colors, hatching, cross-hatching, etc.) for changing the display of an item when it is selected.

Figure 1C:
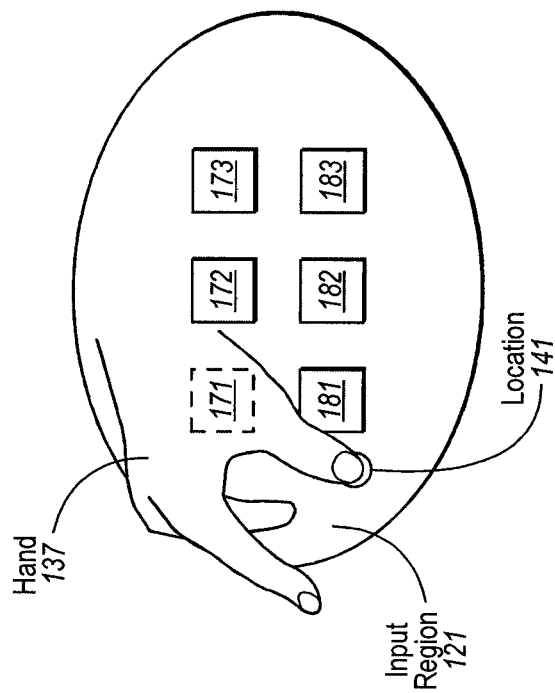
FIGS. 1B through 1G illustrates an example of recognizing a selection region from a set of points.
Figure 1B:
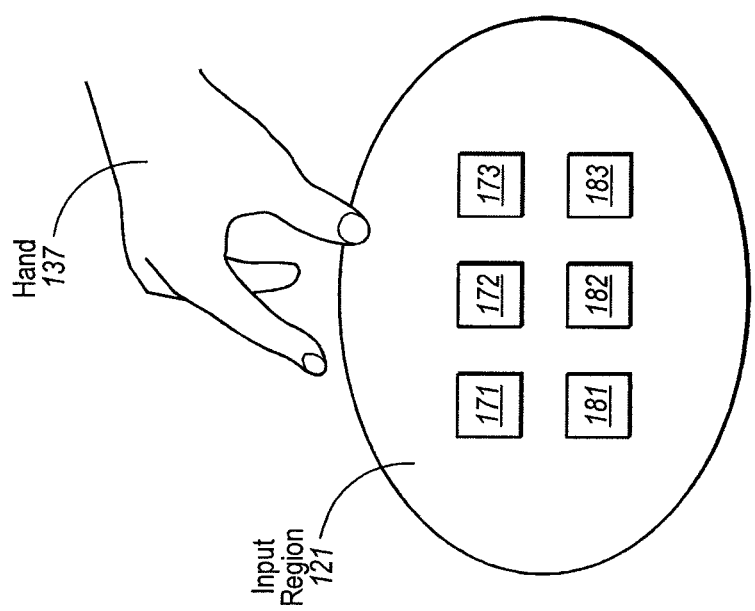
Figure 1E:
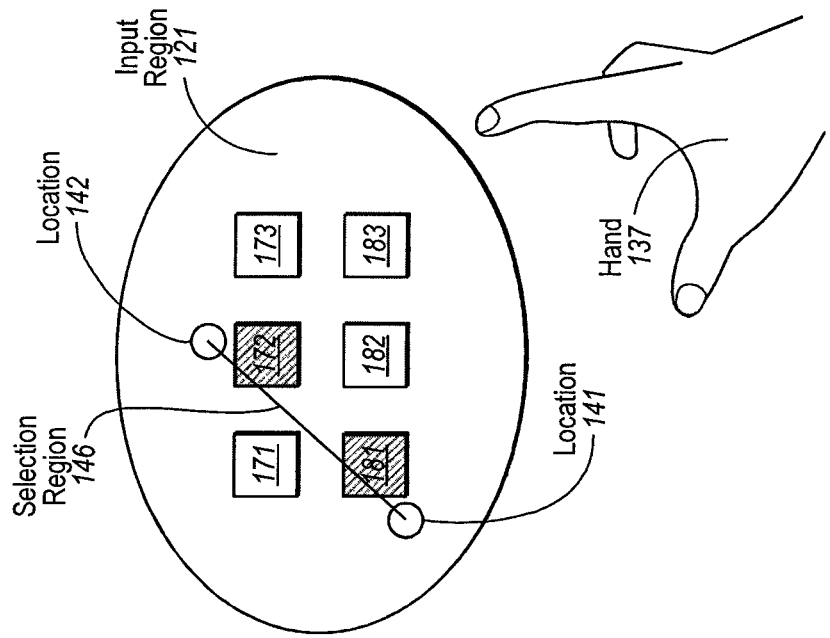
Figure 1D:
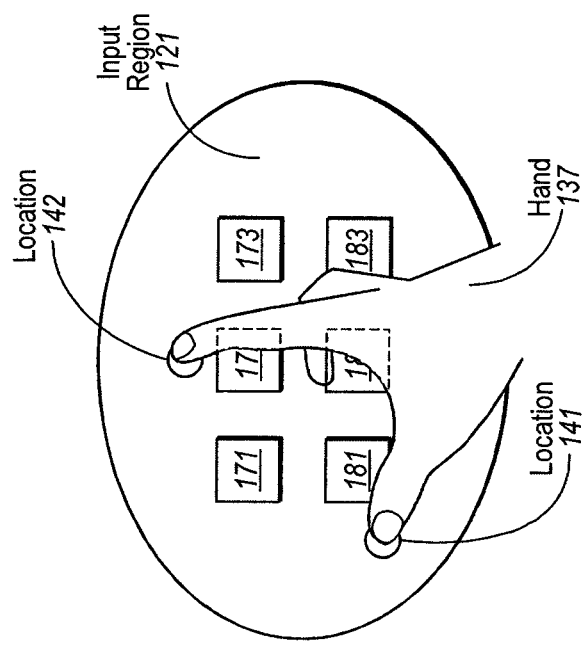
Figure 1G:
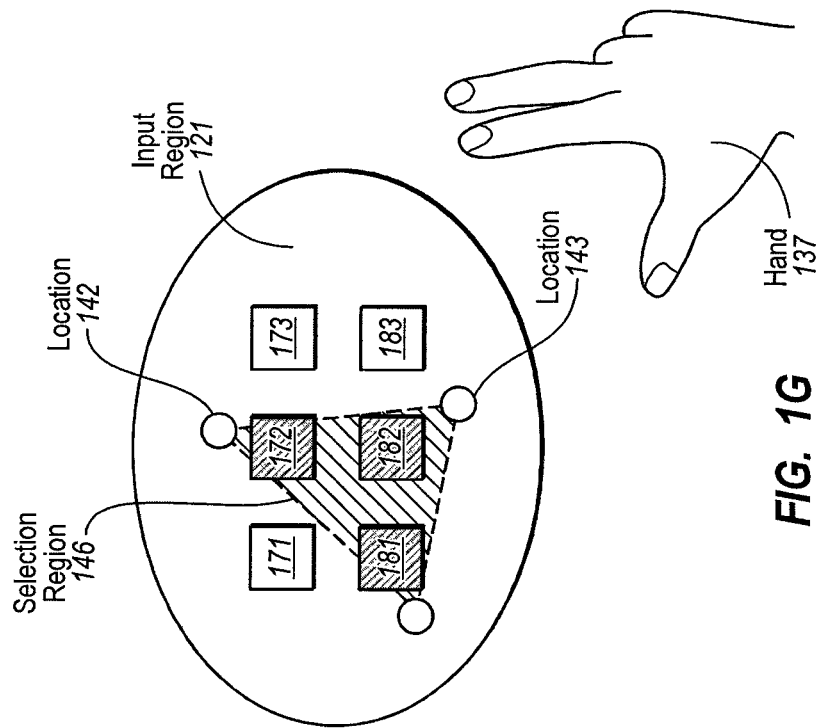
Figure 1F:
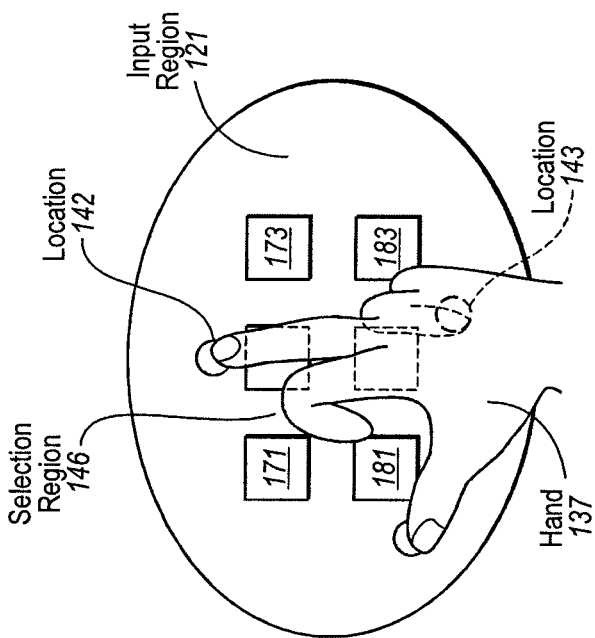
Figure 2:
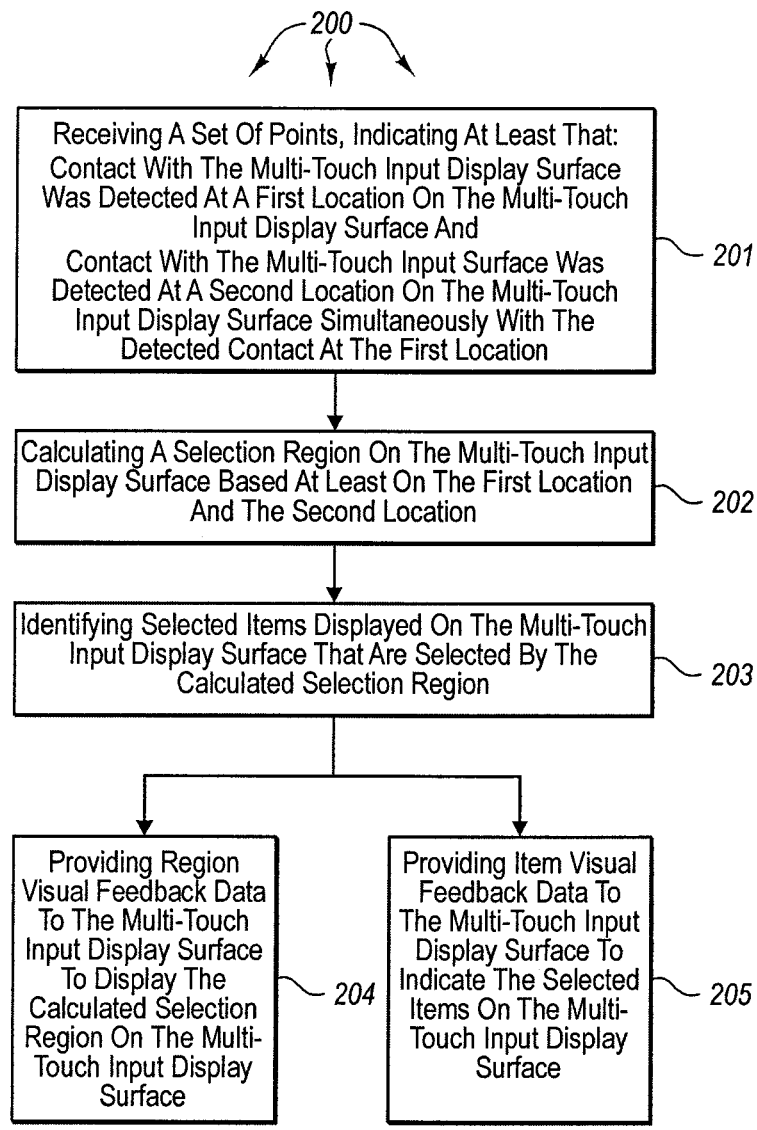
FIG. 2 illustrates a flow chart of an example method for recognizing a selection region.

FIG. 2 illustrates a flow chart of an example method 200 for recognizing a selection region. FIGS. 1B through 1F illustrates an example of recognizing a selection region from a set of points. The method 200 will be described with respect to the components and data depicted in FIG. 1A and with reference to FIGS. 1B through 1G.

Method 200 includes an act of receiving a set of points (act 201). The set of points indicates at least that: contact with a multi-touch input display surface was detected at a first location on the multi-touch input display surface and contact with the multi-touch input surface was detected at a second location on the multi-touch input display surface simultaneously with the detected contact at the first location. Referring now to FIG. 1B, FIG. 1B depicts an expanded view of input region 121 relative to hand 137. Displayed within input region 121 are items 171, 172, and 173 and items 181, 182, and 183.

Moving to FIG. 1C, the thumb of hand 137 is placed in contact with multi-touch input display surface 102 at location 141. Sensors 103 can detect contact at location 141 and send this information as raw sensor data to sensor interface 113. Sensor interface 113 can buffer the raw sensor data and/or convert the raw sensor data to contact input data.

Moving to FIG. 1D, the middle finger of hand 137 is placed in contact with multi-touch input display surface 102 at location 142, while the thumb of hand 137 remains in contact at location 141. Sensors 103 can detect simultaneous contact at locations 141 and 142 and send this information as raw sensor data to sensor interface 113. Sensor interface 113 can buffer the raw sensor data and/or convert the raw sensor data to contact input data.

Method 200 includes an act of calculating a selection region on the multi-touch input display surface based at least on the first location and the second location (act 202). For example, subsequent to simultaneously touching locations 141 and 142, hand 137 can be raised from multi-touch input display surface 102 such that there is no contact. Removal of contact at all locations can trigger selection region calculation. Thus, referring back to FIG. 1A, sensors 103 can detect that there is no contact on multi-touch input display surface 102. Detection of no contact can indicate to sensor interface 113 that region selection is complete. Accordingly, sensor interface 113 can send contact input data 127A to set creation module 104.

Set creation module 104 abstract the contact at locations 141 and 142 to create set of points 116A including a point for location 141 and a point for location 142. Set of points 116A can be ordered or unordered, for example, based on context 122. Set of points 116A can be sent to input region calculation module 107. Based on context 122, input region calculation module 107 can select and utilize an appropriate region calculation algorithm from among region calculation algorithms 130. For example, input region calculation module 107 can select and utilize algorithm 131.

Various different algorithms can be utilized to calculate different types and shapes of selection regions. For example, different algorithms can be used to calculate convex hull, shrink wrap hull, rectangular, linear, circular, elliptical, etc. selection regions from a set of points. It may be that algorithm 131 is an algorithm for calculating a linear selection region between two points. Accordingly, input region calculation module 107 can utilize algorithm 131 to calculate selection region 146.

Method 200 includes an act of identifying selected items displayed on the multi-touch input display surface that are selected by the calculated selection region (act 203). Input region calculation module 107 can receive current display data 123, indicative of the display locations of items 171, 172 and 173 and 181, 182, and 183. From current display data 123, input region calculation module 107 can identify that selection region 146 intersects items 172 and 181.

Method 200 includes an act of providing region visual feedback data to the multi-touch input display surface to display the calculated selection region on the multi-touch input display surface (act 204). For example, input selection module 109 can provide region feedback data 151 to graphical subsystem 157. Referring to FIG. 1E, graphical subsystem 157 can utilize region feedback data 151 to display a line between location 141 and location 142 representing selection region 146.

Method 200 includes an act of providing item visual feedback data to the multi-touch input display surface to visually indicate the selected items on the multi-touch input display surface (act 205). For example, input selection module 109 can provide item feedback data 152 to graphical subsystem 157. Graphical subsystem 157 can utilize item feedback data 152 to visually indicate that items 172 and 181 are selected. In FIG. 1E, hatching is used to indicate that items 172 and 181 are selected. However, any visual indication can be used.

Method 200 is also applicable to sets of three or more points. For example, moving to FIG. 1F, the ring finger of hand 137 is placed in contact with multi-touch input display surface 102 at location 143, while the thumb of hand 137 remains in contact at location 141 and the middle finger of hand 137 remains in contact at location 142. Sensors 103 can detect simultaneous contact at locations 141, 142, and 143 and send this information as raw sensor data to sensor interface 113. Sensor interface 113 can buffer the raw sensor data and/or convert the raw sensor data to contact input data.

Subsequent to simultaneously touching locations 141, 142, and 143, hand 137 can be raised from multi-touch input display surface 102 such that there is no contact. Sensors 103 can detect that there is no contact on multi-touch input display surface 102. Detection of no contact can indicate to sensor interface 113 that region selection is complete. Accordingly, sensor interface 113 can send contact input data 127A to set creation module 104.

Set creation module 104 can abstract the contact at locations 141, 142, and 143 to create set of points 116A including a point for location 141, a point for location 142, and a point for location 143. Set of points 116A can be ordered or unordered, for example, based on context 122. Set of points 116A can be sent to input region calculation module 107.

Based on context 122, input region calculation module 107 can select and utilize an appropriate region calculation algorithm from among region calculation algorithms 130. For example, input region calculation module 107 can select and utilize algorithm 132. It may be that algorithm 132 is an algorithm for calculating a convex hull form three of more points. Accordingly, input region calculation module 107 can utilize algorithm 132 to calculate selection region 146.

Input region calculation module 107 can receive current display data 123, indicative of the display locations of items 171, 172 and 173 and 181, 182, and 183. From current display data 123, input region calculation module 107 can identify that selection region 147 contains or at least intersects items 172, 181, and 182.

Input selection module 109 can provide region feedback data 151 to graphical subsystem 157. Referring to FIG. 1G, graphical subsystem 157 can utilize region feedback data 151 to display convex hull selection region 146 based on locations 141, 142, and 143. Hatching is used to indicate convex hull selection region 146. However, any visual indication can be used.

Input selection module 109 can provide item feedback data 152 to graphical subsystem 157. Graphical subsystem 157 can utilize item feedback data 152 to visually indicate that items 172, 181, and 182 are selected. In FIG. 1G, hatching is used to indicate that items 172, 181, and 182 are selected. However, any visual indication can be used.

FIGS. 4A through 4E illustrate examples of different types of selection regions that can be recognized from a set of points. The different types of selection regions can be calculated using various different algorithms in region calculation algorithms 130.

Figure 4A:
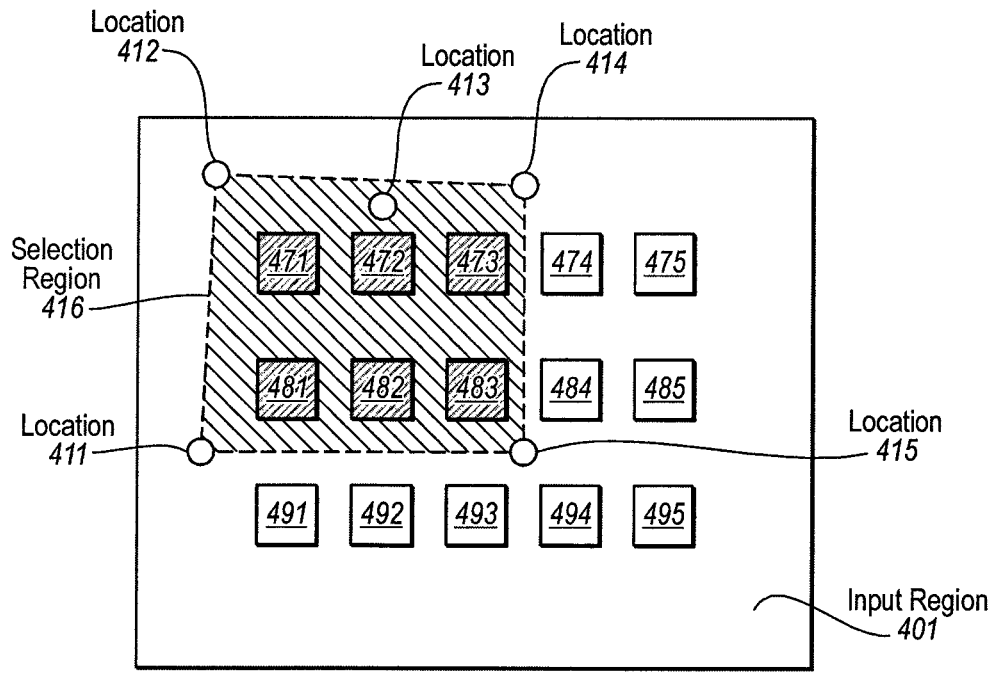
FIGS. 4A through 4E illustrate examples of different types of selection regions that can be recognized from a set of points.
Figure 4B:
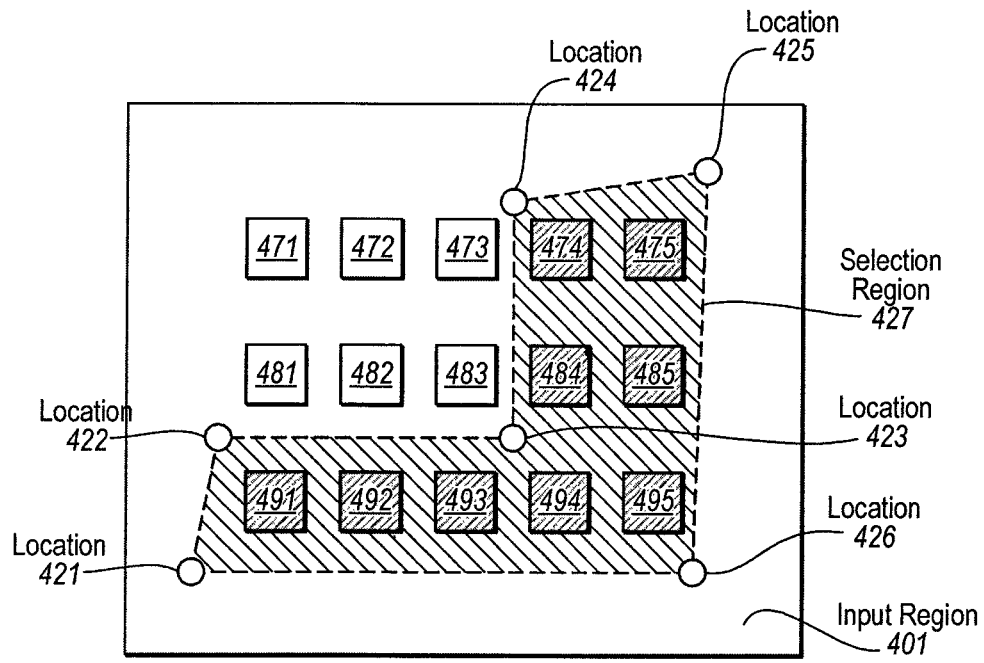

FIG. 4A depicts items 471, 472, 473, 474, and 475, and items 481, 482, 483, 484, and 485, and items 491, 492, 493, 494, and 495 within input region 401. Contact has simultaneously been detected at locations 411, 412, 413, 414, and 415. From the detected contact at locations 411, 412, 413, 414, and 415, a convex hull algorithm can be used to calculate convex hull selection region 416. It can be identified that items 471, 472, 473, 481, 482, and 483 are within convex hull selection region 416. Region feedback data can be used to display convex hull selection region 416. Item feedback data can be utilized to visually indicate that items 471, 472, 473, 481, 482, and 483 are selected FIG. 4B depicts items 471, 472, 473, 474, and 475, and items 481, 482, 483, 484, and 485, and items 491, 492, 493, 494, and 495 within input region 401. Contact has simultaneously been detected at locations 421, 422, 423, 424, 425, and 426. From the detected contact at locations 421, 422, 423, 424, 425, and 426, a shrink wrap hull algorithm can be used to calculate shrink wrap hull selection region 427. A shrink wrap hull algorithm can utilize an ordered set of points to calculate a shrink wrap hull selection region.

Figure 4C:
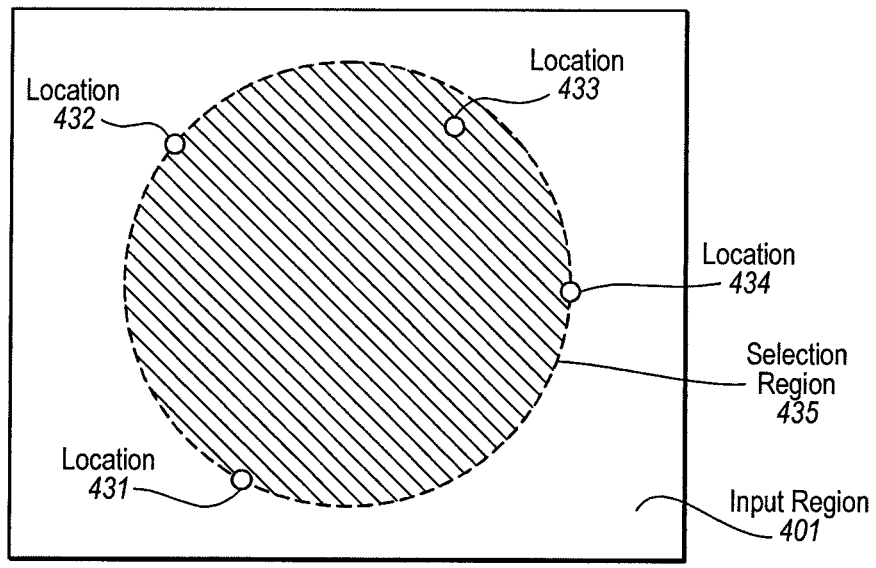

FIG. 4C depicts input region 401. Contact has simultaneously been detected at locations 431, 432, 433, and 434. From the detected contact at locations 431, 432, 433, and 434, a circle creation algorithm can be used to calculate circular selection region 435. The circle creation algorithm can be used to calculate the smallest possible circular area that contains all contact locations.

Figure 4D:
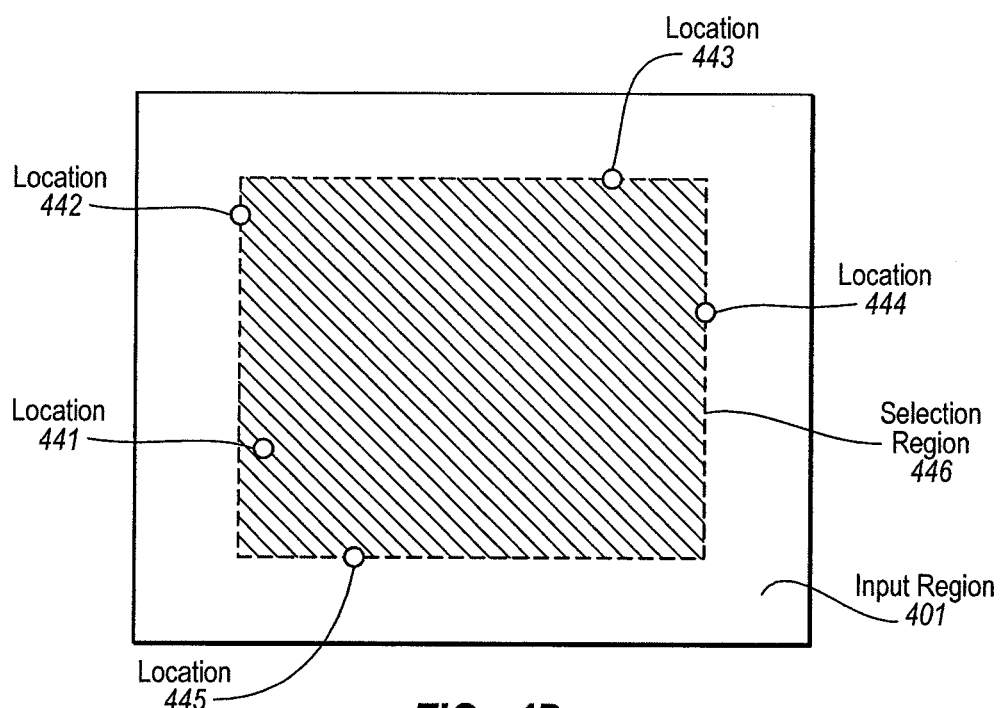

FIG. 4D depicts input region 401. Contact has simultaneously been detected at locations 441, 442, 443, 444, and 445. From the detected contact at locations 441, 442, 443, 444, and 445, a rectangle creation algorithm can be used to calculate rectangular selection region 446. The rectangle creation algorithm can be used to calculate the smallest possible rectangular area that contains all contact locations.

Figure 4E:
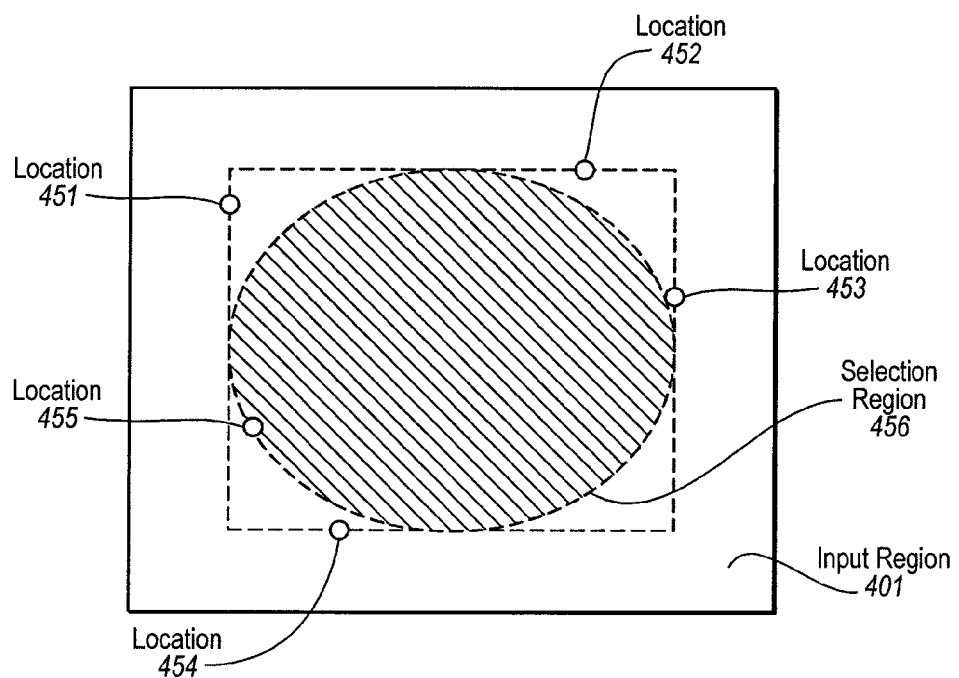

FIG. 4E depicts input region 401. Contact has simultaneously been detected at locations 451, 452, 453, 454, and 455. From the detected contact at locations 451, 452, 453, 454, and 455, an ellipse creation algorithm can be used to calculate elliptical selection region 456. The ellipse creation algorithm can be used to calculate the smallest possible rectangular area that contains all contact locations. A resulting ellipse can then be sized based on the size of the calculated rectangle.

Input region 401 can be a portion of multi-touch input display surface 102 or some other similar surface.

It should be understood that each of the described multi-point selection methods can be dynamically modified, so no guess work is necessary to determine a proper starting points for accurately representing a selection area. Each finger can be moved independently to refine the selection area. Visual feedback is updated to match user input.

Figure 1H:
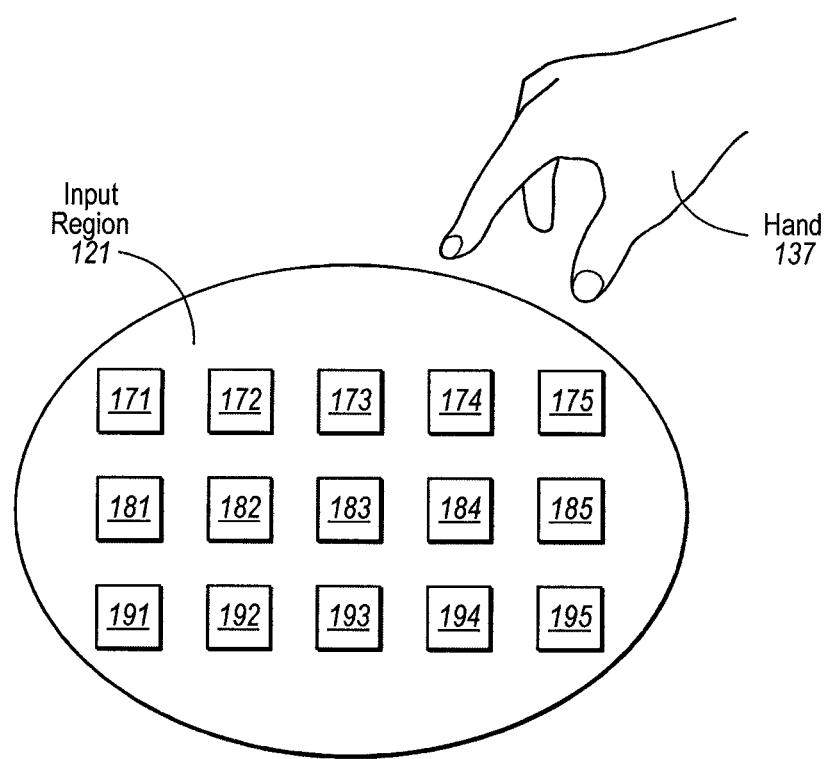
FIGS. 1H through 1J illustrates an example of recognizing a selection region from an area of contact.
Figure 1I:
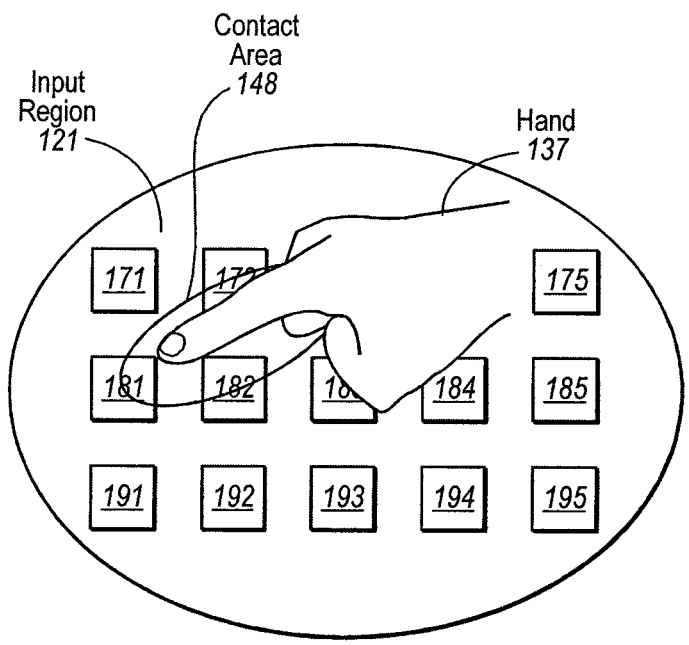
Figure 1J:
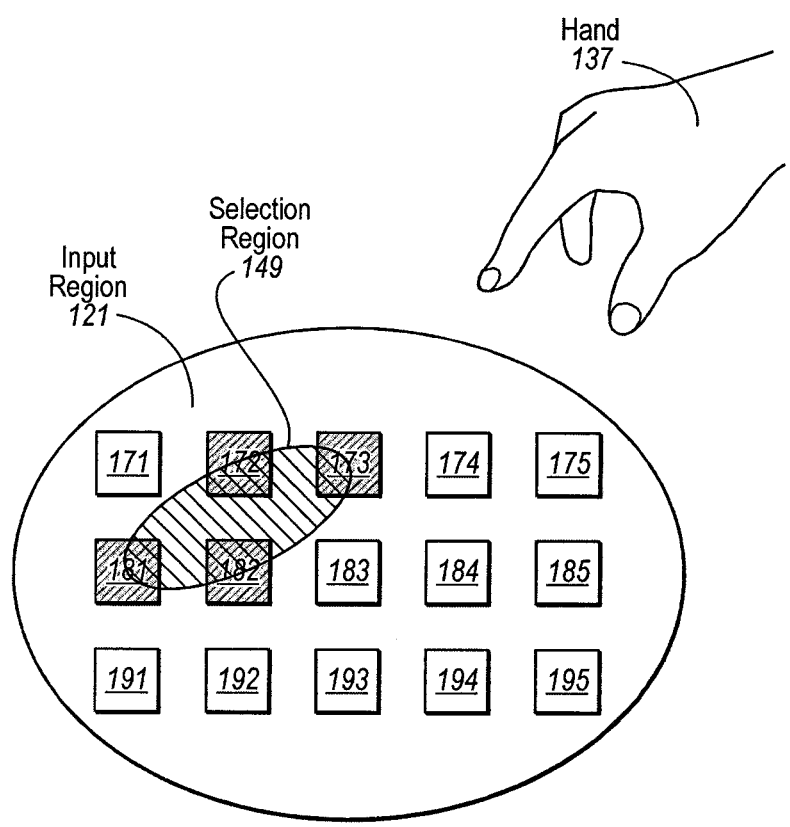
Figure 3:
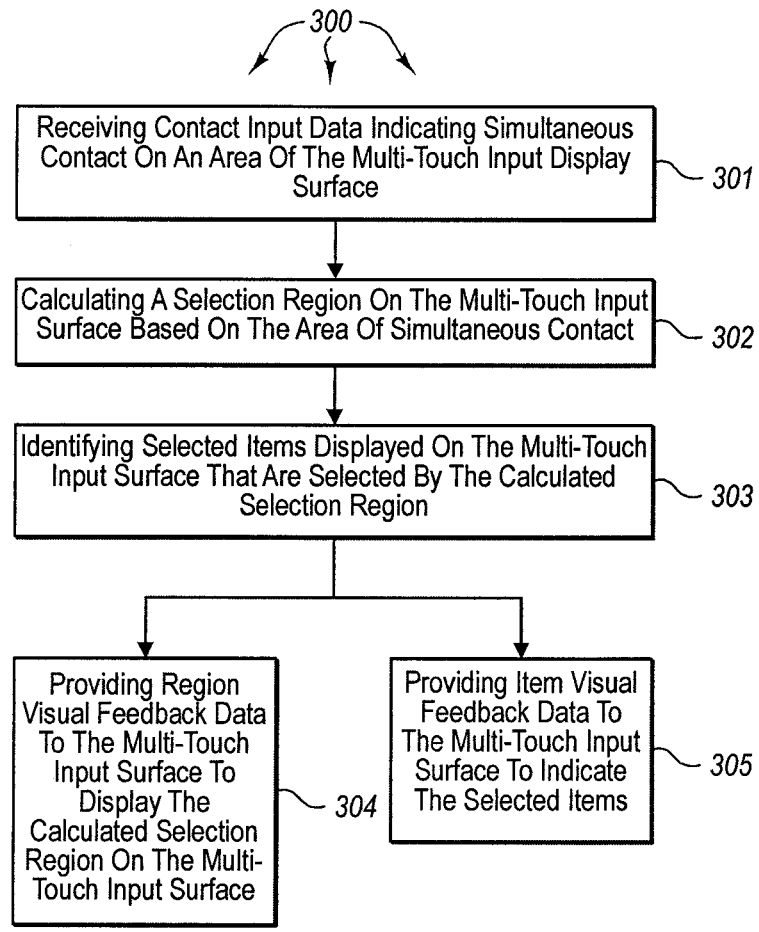
FIG. 3 illustrates a flow chart of an example method for recognizing a selection region.

Turning now to FIG. 3, FIG. 3 illustrates a flow chart of an example method 300 for recognizing a selection region. FIGS. 1H through 1J illustrate an example of recognizing a selection region from an area of contact. The method 300 will be described with respect to the components and data depicted in FIG. 1A and with reference to FIGS. 1H through 1J.

Method 300 includes an act of receiving input contact data indicating simultaneous contact on an area of the multi-touch input display surface (act 301). Referring now to FIG. 1H, FIG. 1H depicts an expanded view if input region 121 relative to hand 137. Displayed within input region 121 are items 171, 172, 173, 174 and 175, items 181, 182, 183, 184, and 185, and items 191, 192, 193, 194, and 195.

Turning to FIG. 1I, a portion of the index finger of hand 137 can be placed in contact with multi-touch input display surface 102 at contact area 148. Sensors 103 can detect simultaneous contact at contact area 148 and send this information as raw sensor data to sensor interface 113. Sensor interface 113 can buffer the raw sensor data and/or convert the raw sensor data to contact input data.

Method 300 includes an act of calculating a selection region on the multi-touch input surface based on the area of simultaneous contact (act 302). For example, subsequent to touching contact area 148, hand 137 can be raised from multi-touch input display surface 102 such that there is no contact. Removal of contact at all locations can trigger selection region calculation. Thus, referring back to FIG. 1A, sensors 103 can detect that there is no contact on multi-touch input display surface 102. Detection of no contact can indicate to sensor interface 113 that region selection is complete. Accordingly, sensor interface 113 can send contact input data 127A to input region calculation module 107 (as indicated by the dashed line).

Various different algorithms can be utilized to calculate different types and shapes of selection regions. It may be that algorithm 133 is an algorithm for setting a selection region equal to a detected area of contact. Accordingly, input region calculation module 107 can utilize algorithm 133 to calculate selection region 149.

Method 300 includes an act of identifying selected items displayed on the multi-touch input surface that are selected by the calculated selection region (act 303). Input region calculation module 107 can receive current display data 123, indicative of the display locations of items 171, 172, 173, 174 and 175, items 181, 182, 183, 184, and 185, and items 191, 192, 193, 194, and 195. From current display data 123, input region calculation module 107 can identify that selection region 149 intersects items 172, 173, 181, and 182.

Method 300 includes an act of providing region visual feedback data to the multi-touch input surface to display the calculated selection region on the multi-touch input surface (act 304). For example, input selection module 109 can provide region feedback data 151 to graphical subsystem 157. Referring to FIG. 1J, graphical subsystem 157 can utilize region feedback data 151 to display selection region 149 representing contact area 148. Hatching is used to indicate selection region 149. However, any visual indication can be used.

Method 300 includes an act of providing item visual feedback data to the multi-touch input surface to visually indicate the selected items (act 305). Input selection module 109 can provide item feedback data 152 to graphical subsystem 157. Graphical subsystem 157 can utilize item feedback data 152 to visually indicate that items 172, 173, 181, and 182 are selected. In FIG. 1J, hatching is used to indicate that items 172, 173, 181, and 182 are selected. However, any visual indication can be used.

Although FIGS. 1H through 1J depicted the side of hand 137, other portions of a hand, such as, for example, the side of a hand, knuckles, etc., can be used to calculate a selection region equal to an area of contact.

As previously described, sensors 103 can sample the entirety of multi-touch input display surface 102 at specified intervals. Each sample can be referred to as a frame. Generally, input region calculation module 107 can interpolate an area between a first and second frame as points of contact are moved on multi-touch input display surface 102. The interpolated area can be included in a selection region along with the area of any selection regions calculated from points of contact in the first and second frames. The interpolated area can be adjusted in third and subsequent frames as points of contact are further moved on multi-touch input display surface 102. This permits a user to essentially "paint" a selection region on multi-touch input display surface 102.

Figure 6A:
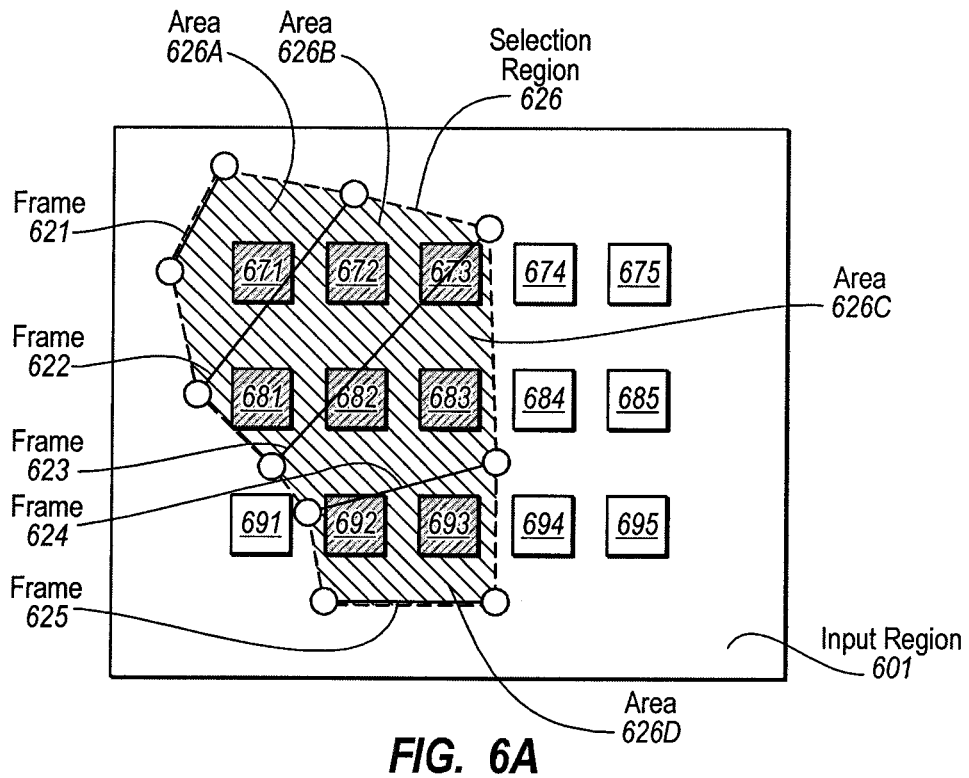
FIGS. 6A through 6C illustrate examples of painting a selection region from a set of points.
Figure 6B:
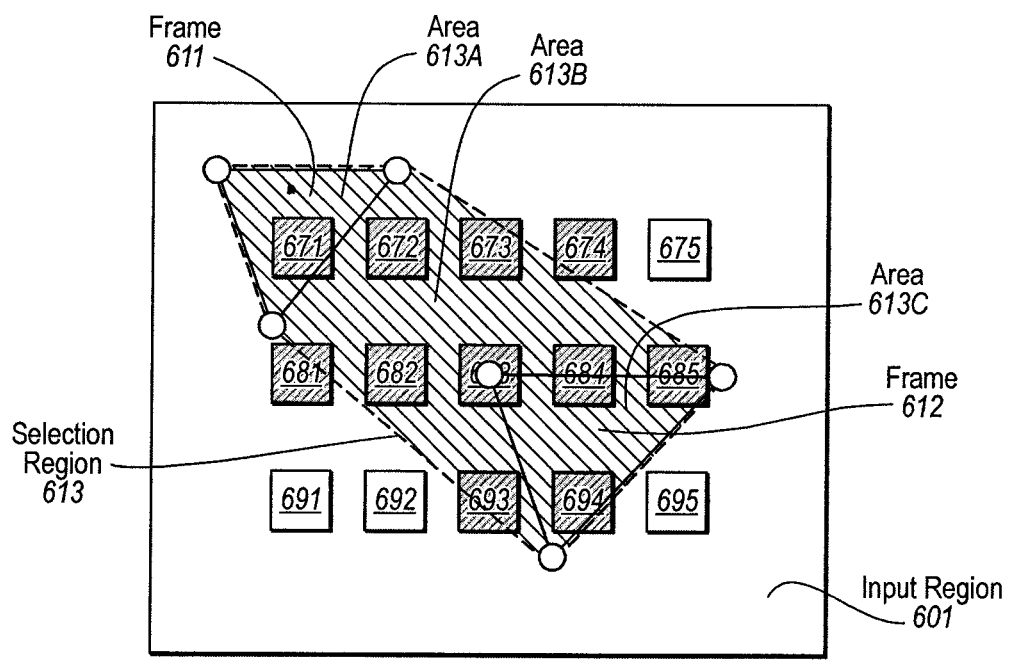
Figure 6C:
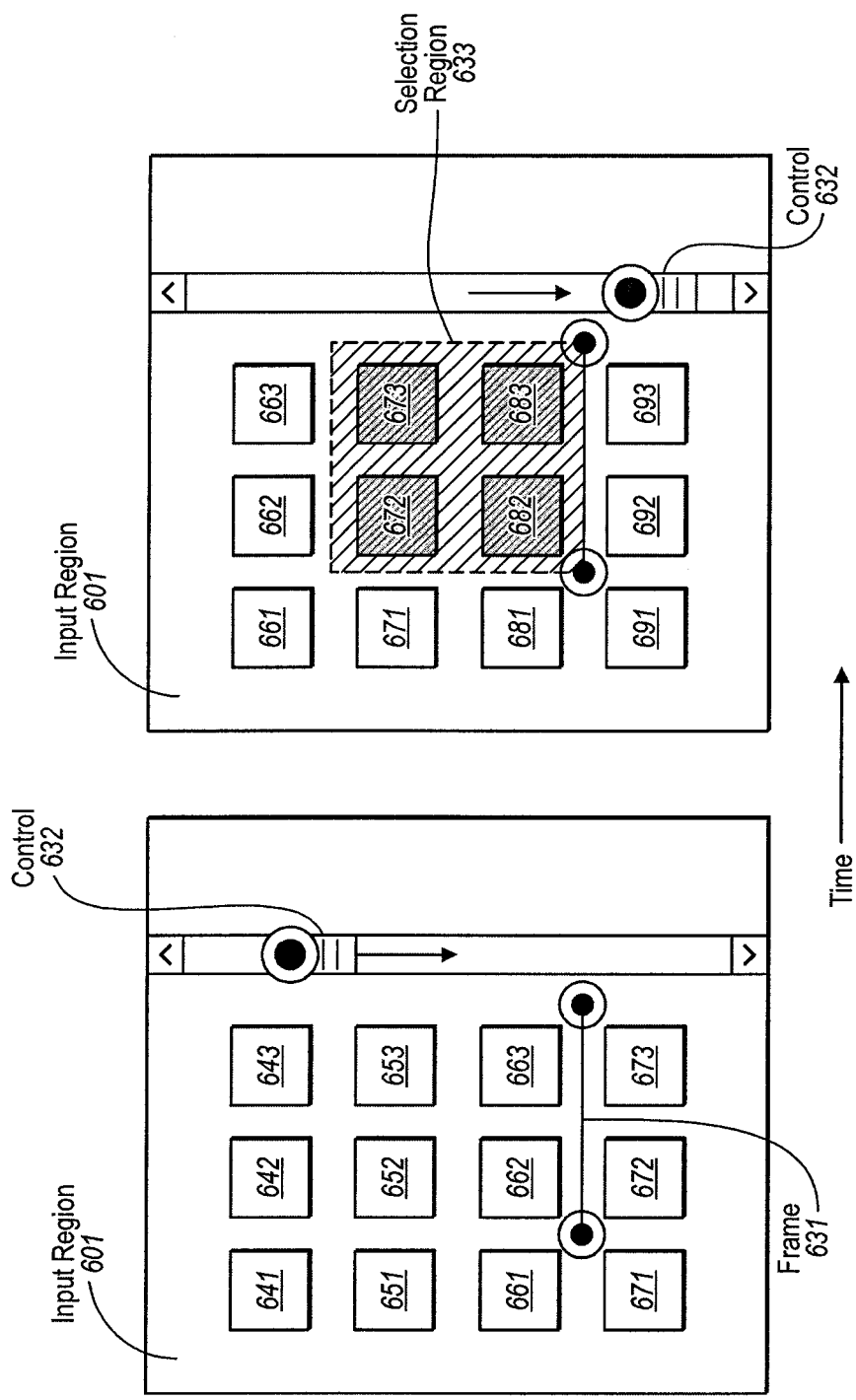

FIGS. 6A and 6B depict items 671, 672, 673, 674, and 675, and items 681, 682, 683, 684, and 685, and items 691, 692, 693, 694, and 695 within input region 601. FIG. 6C depicts different views of input region 601 that include items 641, 642, and 643, items 651, 652, and 653, items 661, 662, and 663, items 671, 672, and 673, and items 681, 682, and 683, and items 691, 692, and 693.

Figure 7:
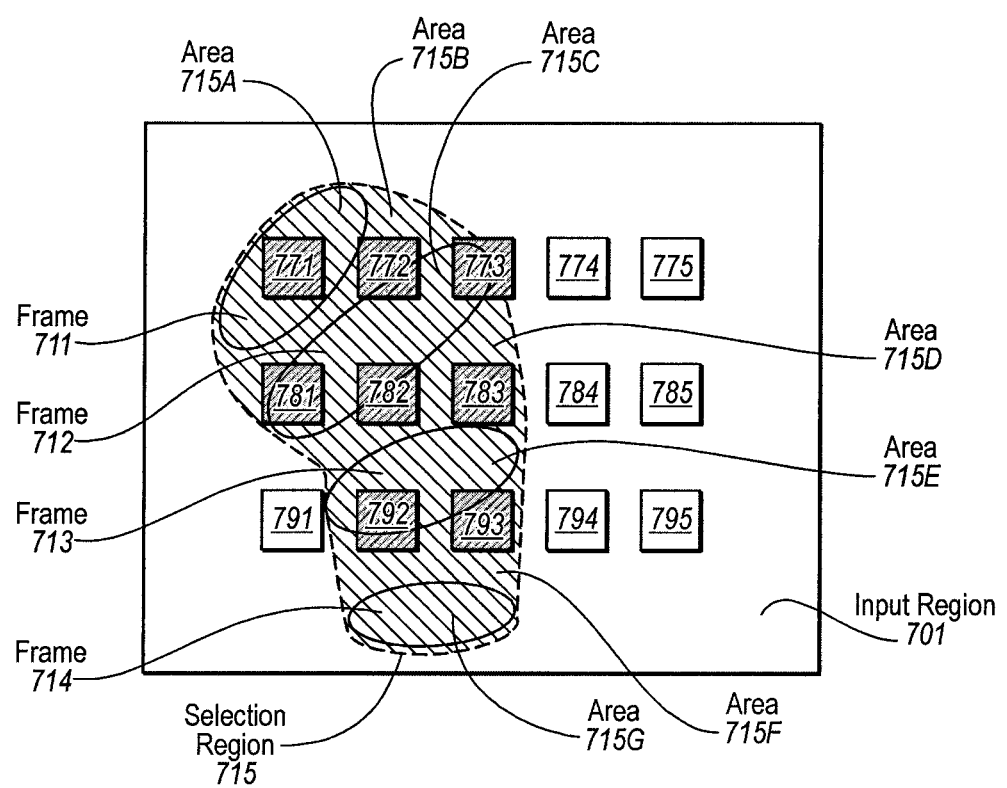
FIG. 7 illustrates an example of painting a selection region from an area of contact.

FIG. 7 depict items 771, 772, 773, 774, and 775, and items 781, 782, 783, 784, and 785, and items 791, 792, 793, 794, and 795 within input region 701.

Input regions 601 and 701 can be portions of multi-touch input display surface 102 or some other similar surface.

Figure 5:
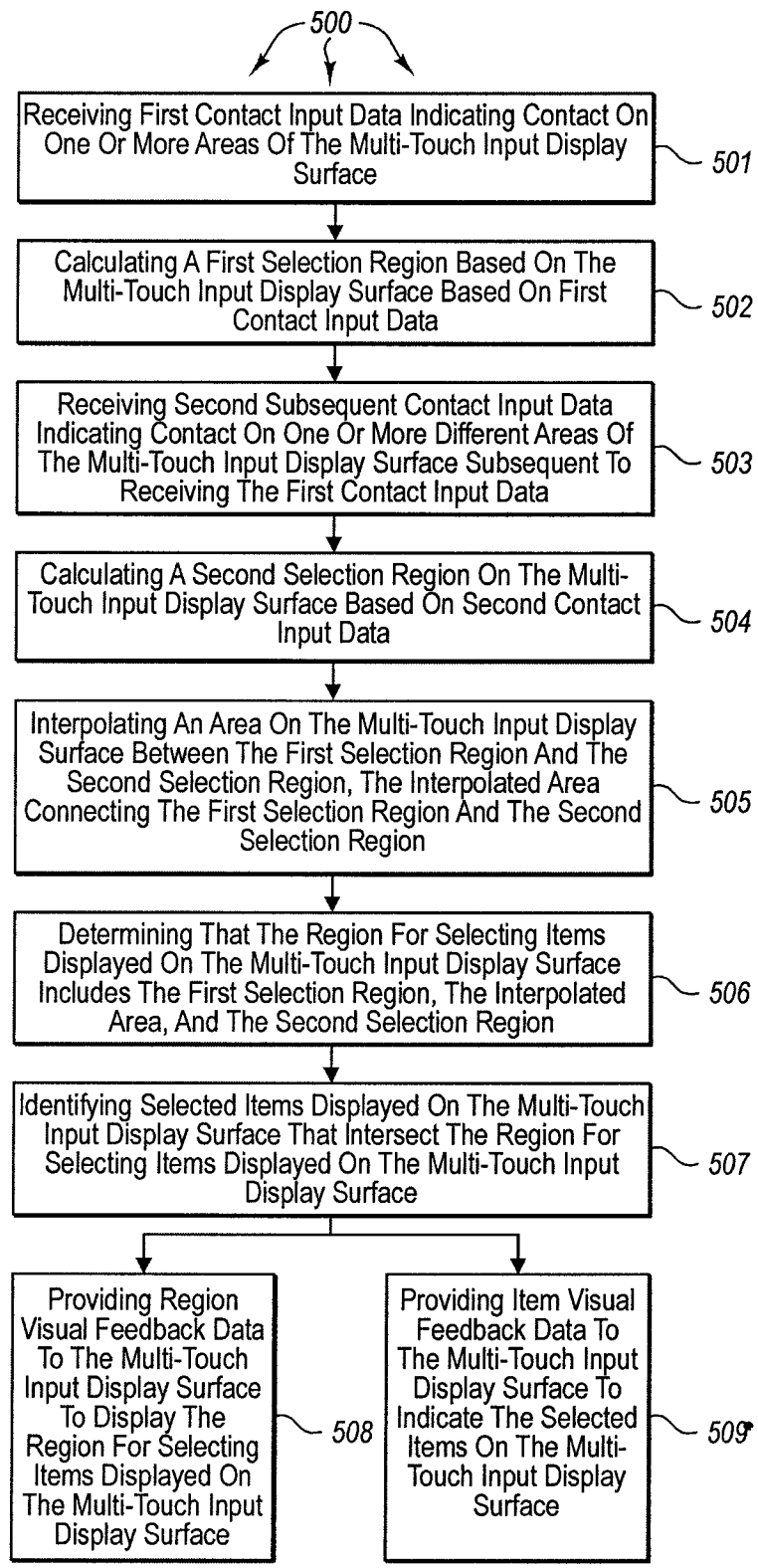
FIG. 5 illustrates a flow chart of an example method for recognizing a selection region.

Turning now to FIG. 5, FIG. 5 illustrates a flow chart of an example method 500 for recognizing a selection region. FIGS. 6A through 6C illustrate examples of painting a selection region from a set of points. FIG. 7 illustrates an example of painting a selection region from an area of contact. The method 500 will be described with respect to the components and data depicted in FIG. 1A and with reference to FIGS. 6A through 6C and FIG. 7.

Method 500 includes an act of receiving first contact input data indicating contact on one or more areas of the multi-touch input display surface (act 501). For example, set creation module 104 can receive contact input data 127A. Referring to FIG. 6A, contact input data 127A can represent first contact locations at either end of the linear selection region corresponding to frame 621. Set creation module 104 can abstract the first locations to first points (e.g., set of points 116A) in a coordinate system of multi-touch input display surface 102. Set creation module can send the first points to input region calculation module 107.

Method 500 includes an act of calculating a first selection region based on the multi-touch input display surface based on first contact input data (act 502). For example, based on the first points received from set creation module 104, input region calculation module 107 can calculate the linear selection region in frame 621.

Method 500 includes an act of receiving second subsequent contact input data indicating contact on one or more different areas of the multi-touch input display surface subsequent to receiving the first contact input data (act 503). For example, set creation module 104 can receive contact input data 127B. Referring to FIG. 6A, contact input data 127B can represent second contact locations at either end of the linear selection region corresponding to frame 622. Contact input data 127B can also indicate that first contact locations in frame 621 remained in constant contact with multi-touch input display surface 102 while being moved to the second contact locations in frame 622. Set creation module 104 can abstract the second locations to second points (e.g., set of points 116B) in the coordinate system of multi-touch input display surface 102. Set creation module can send the second points to input region calculation module 107.

Method 500 includes an act of calculating a second selection region on the multi-touch input display surface based on second contact input data (act 504). For example, based on the second points received from set creation module 104, input region calculation module 107 can calculate the linear selection region in frame 622. The linear selection regions in frames 621 and 622 can be calculated from contact with two fingers against input region 601 that remain in contact with the surface and are dragged (e.g., along the dashed line) on the surface.

Method 500 includes an act of interpolating an area on the multi-touch input display surface between the first selection region and the second selection region, the interpolated area connecting the first selection region and the second selection region (act 505). For example, input region selection module 109 can interpolate area 626A from the linear selection regions in frames 621 and 622.

Method 500 includes an act of determining that the region for selecting items displayed on the multi-touch input display surface includes the first selection region, the interpolated area, and the second selection region (act 506). For example, input region selection module 109 can determine that selection region 626 is to include the linear selection region in frames 621, area 626A, and the linear selection region in frame 622. Method 500 includes an act of identifying selected items displayed on the multi-touch input display surface that intersect the region for selecting items displayed on the multi-touch input display surface (act 507). For example, input region selection module 109 can identify that item 671 is selected by selection region 626.

Method 500 includes an act of providing visual feedback data to the multi-touch input display surface to display the region for selecting items displayed on the multi-touch input display surface (act 508). For example, input selection module 109 can provide region feedback data (e.g., region feedback data 151) to graphical subsystem 157. Graphical subsystem 157 can utilize the region feedback data 151 to display a boundary of area 626A. In FIG. 6A, hatching is used to indicate area 626A. However, any visual indication can be used.

Method 500 includes an act of providing item visual feedback data to the multi-touch input display surface to indicate the selected items on the multi-touch input display surface (act 509). For example, input selection module 109 can provide item feedback data (e.g., item feedback data 152) to graphical subsystem 157. Graphical subsystem 157 can utilize item feedback data 152 to visually indicate that item 671 is selected. In FIG. 6A, hatching is used to indicate that item 671 is selected. However, any visual indication can be used.

Still referring to FIG. 6A, as contact locations remain in constant contact with the surface and are further moved, linear selection regions of frame 623, 624, and 625 can be calculated. Correspondingly, input region calculation module 107 can interpolate areas 626B, 626C, and 626D and add areas 626B, 626C, and 626D to selection region 626. As areas are added, visual region and item feedback can be provided to indicate the boundaries of selection region 626 and items that are selected. The resulting selection region 626 is bounded by the dashed line. Items 671, 672, 673, 681, 682, 683, 692, and 693 are selected. Although hatching is used to indicate area 626 and selected items, other visual indications can also be used.

Input region calculation module 107 can also interpolate areas of a selection region when selection regions are calculated using other selection region calculation algorithms. For example, referring now to FIG. 6B, first contact input data can represent first contact locations at vertices of a first convex hull selection region corresponding to frame 611. The first convex hull selection region bounds area 613A. Subsequent second contact data can represent second contact locations at vertices of a convex hull selection region corresponding to frame 612. The second convex hull selection region bounds area 613C. The first and the second convex hull regions can be calculated from contact with three fingers against input region 601 that remain in contact with the surface and are dragged on the surface.

From the first convex full region and the second convex hull region, input region selection module 109 can interpolate that area 613B is also to be included in selection region 613. Visual region and item feedback can be provided to indicate the boundaries of selection region 613 and items that are selected. The resulting selection region 613 is bounded by the dashed line. Items 671, 672, 673, 674, 681, 682, 683, 684, 685, 693, and 694 are selected. Although hatching is used to indicate area 613 and selected items, other visual indications can also be used.

Input region calculation module 107 can also interpolate areas of a selection region when the background is moved relative to selection region (e.g., through the manipulation of external controls). For example, referring now to FIG. 6C, a linear selection region is depicted for a frame 631. While contact is sustained at the end points of the linear selection region (e.g., fingers remain in contact with the surface), control 632 can be manipulated (e.g., with another finger or a mouse) to move the observable portion of input region 601 relative to the linear selection region. Graphical subsystem 157 can indicate this change in the observable portion of input region 601 (e.g., through current display data 123) to input region calculation module 107.

From the change in the observable portion of input region 601, input region calculation module 107 can interpolate selection region 633. Visual region and item feedback can be provided to indicate the boundaries of selection region 633 and items that are selected. The resulting selection region 633 is bounded by the dashed line. Items 672, 673, 682, and 683 are selected. Although hatching is used to indicate area 633 and selected items, other visual indications can also be used.

Input region calculation module 107 can also interpolate areas of a selection region when selection regions are based on areas of contact. For example, referring now to FIG. 7, first contact input data can represent a selection region corresponding to contact at area 715A for frame 711. Subsequent second contact data can represent a selection region corresponding to contact at area 715C for frame 712. Contact areas 715A and 715C can be calculated from contact with the side of a hand or length of a finger that remains (to some extent) in contact with the surface and is dragged on the surface.

From contact areas 715A and 715C, input region calculation module 107 can interpolate that area 715B is also to be included in selection region 715. Still referring to FIG. 7, as the area of contact remains in constant contact (to some extent) with the surface and is further moved, selection regions corresponding to contact areas 715E and 715G for frames 713 and 714 respectively can be calculated. Correspondingly, input region calculation module 107 can interpolate areas 715D and 715F and add areas 715D and 715F to selection region 715. As areas are added, visual region and item feedback can be provided to indicate the boundaries of selection region 715 and items that are selected. The resulting selection region 715 is bounded by the dashed line. Items 771, 772, 773, 781, 782, 783, 792, and 793 are selected. Although hatching is used to indicate area 715 and selected items, other visual indications can also be used.

Embodiments of the present invention facilitate flexible, efficient, and simple creation of selection regions. Computer system users can use natural and/or more intuitive hand gestures to select items on an input/display surface. Selection regions can be dynamically adjusted in response to detected changes in contact at different locations on a surface. For example, selection region changes can be updated in essentially real-time as fingers are added and moved. The calculation of selection regions can vary based on an application and/or operating system context.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a multi-touch input display surface, a method for recognizing a region for selecting items displayed on the multi-touch input display surface, the method comprising:
    an act of detecting a first contact with the multi-touch input display surface at a detected first location on the multi-touch input display surface; and
    an act of detecting a second contact with the multi-touch input display surface at a detected second location on the multi-touch input display surface;
    an act of calculating a selection region on the multi-touch input display surface based at least on the detected first location and the detected second location, wherein calculating the selection region on the multi-touch input display surface comprises calculating the selection region based on a context at the computer system;
    an act of providing region visual feedback data to the multi-touch input display surface, wherein the multi-touch input display surface renders the calculated selection region on the multi-touch input display surface by at least displaying an edge boundary of the calculated selection region on the multi-touch input display surface; and
    an act of selecting at least one item displayed on the multi-touch input display surface that is selected by being included within at least a portion of the calculated selection region.

2. The method as recited in claim 1, wherein the first and second locations each include coordinate locations on the multi-touch input display surface that are abstracted from areas of the first and second contact on the multi-touch input display surface, respectively.

3. The method as recited in claim 2, wherein the first and second contact each occur between a human hand and the multi-touch input display surface.

4. The method as recited in claim 1, wherein the method further includes receiving an ordered set of points for each of the detected first and second locations.

5. The method as recited in claim 1, wherein the at least one item only partially intersects with the selection region.

6. The method as recited in claim 1, wherein the method further includes an act of altering the display characteristics of the at least one item to indicate that the at least one item has been selected.

7. At a computer system including a multi-touch input display surface, a method for dynamically recognizing a region for selecting items displayed on the multi-touch input display surface, the method comprising:
    an act of receiving first contact input data indicating contact at one or more areas of the multi-touch input display surface;
    an act of calculating a first selection region based on the multi-touch input display surface based on the first contact input data;
    an act of receiving second contact input data indicating contact at one or more different areas of the multi-touch input display surface subsequent to receiving the first contact input data;
    an act of calculating a second selection region on the multi-touch input display surface based on the second contact input data, wherein calculating the first and second selection regions includes detecting a context of the computer system that is distinguished from at least one other context of the computer system, wherein each of a plurality of different contexts on the computer system have different region selection requirements, and such that a different region selection algorithm is used for performing the calculation when the computer system is in a first context than when the computer system is in a second context;
    an act of interpolating an area on the multi-touch input display surface between the first selection region and the second selection region, the interpolated area connecting the first selection region and the second selection region;
    an act of determining that the region for selecting items displayed on the multi-touch input display surface includes the first selection region, the interpolated area, and the second selection region; and
    an act of identifying at least one item displayed on the multi-touch input display surface that at least partially intersects the region for selecting items and responsively selecting the at least one item based on the identifying.

8. The method as recited in claim 7, wherein calculating at least one of the first and second selection regions on the multi-touch input display surface comprises calculating the at least one of the first and second selection regions in accordance with a region calculation algorithm.

9. The method as recited in claim 8, wherein the region calculation algorithm is selected from among: a convex hull algorithm, a shrink wrap hull algorithm, a circle creation algorithm, a rectangle creation algorithm, an ellipsis creation algorithm, and a line creation algorithm.

10. The method as recited in claim 7, further comprising:
    an act of receiving third contact input data, subsequent to the second contact input data, indicating contact on one or more different areas of the multi-touch input display surface;
    an act of calculating a third selection region on the multi-touch input display surface based on the third contact input data;
    an act of interpolating a second area on the multi-touch input display surface between the second selection region and the third selection region, the interpolated area connecting the second selection region and the third selection region; and
    an act of determining that the region for selecting items displayed on the multi-touch input display surface includes the first selection region, the interpolated area, the second selection region, the second interpolated area and the third selection region.

11. The method as recited in claim 7, wherein the method further includes an act of providing item visual feedback data to the multi-touch input display surface to visually indicate the at least one item identified within the region for selecting items on the multi-touch input display surface has been selected and by at least changing a display of the selected items from a first display state to a second display state.

12. The method as recited in claim 7, wherein the method further includes an act of providing visual feedback data to the multi-touch input display surface to visually identify and display at least a boundary of the region for selecting items displayed on the multi-touch input display surface.

13. The method as recited in claim 7, further comprising:
an act of dynamically updating the displayed boundary of the region for selecting items as well as display characteristics of any items included within the region, to indicate that said any items are selected, in response to dynamically expanding the region for selecting items in response to new contact input data that is used to calculate a new selection region that is included in the region for selecting items.

14. The method as recited in claim 7, wherein the at least one item includes an items that is only partially disposed within the region for selecting items.

15. The method of claim 7, wherein the context comprises a particular application having focus.

16. At a computer system including a multi-touch input display surface, a method for recognizing a region for selecting items displayed on the multi-touch input display surface, the method comprising:
an act of detecting a first contact with the multi-touch input display surface at a detected first location on the multi-touch input display surface; and
an act of detecting a second contact with the multi-touch input display surface at a detected second location on the multi-touch input display surface;
an act of calculating a selection region on the multi-touch input display surface based at least on the detected first location and the detected second location;
an act of providing region visual feedback data to the multi-touch input display surface, wherein the multi-touch input display surface renders the calculated selection region on the multi-touch input display surface by at least displaying an edge boundary of the calculated selection region on the multi-touch input display surface; and
an act of selecting at least one item displayed on the multi-touch input display surface that is selected by being included within at least a portion of the calculated selection region, wherein the at least one item only partially intersects with the selection region.

17. The method of claim 16, wherein the method further includes an act of providing region visual feedback data to the multi-touch input surface to display the calculated selection region on the multi-touch input surface by at least displaying the boundaries of the calculated selection region on the multi-touch input display surface.

18. The method as recited in claim 16, wherein the first contact and the second contact are made simultaneously on the multi-touch input display surface.

* * * * *